US010017716B2

United States Patent

Oberlin et al.

(10) Patent No.: US 10,017,716 B2
(45) Date of Patent: Jul. 10, 2018

(54) IMIDAZOLE-MODIFIED CARBOHYDRATE POLYMERS AS LAUNDRY DYE TRANSFER INHIBITORS

(71) Applicants: Rohm and Haas Company, Philadelphia, PA (US); Union Carbide Chemicals & Plastics Technology LLC, Midland, MI (US)

(72) Inventors: Anne Oberlin, Antibes (FR); Emmett M. Partain, III, Bound Brook, NJ (US)

(73) Assignees: Rohm and Haas Company, Philadelphia, PA (US); Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 15/504,666

(22) PCT Filed: Aug. 11, 2015

(86) PCT No.: PCT/US2015/044585
§ 371 (c)(1),
(2) Date: Feb. 17, 2017

(87) PCT Pub. No.: WO2016/028541
PCT Pub. Date: Feb. 25, 2016

(65) Prior Publication Data
US 2017/0275562 A1  Sep. 28, 2017

(30) Foreign Application Priority Data

Aug. 22, 2014 (FR) .................................. 14 290255

(51) Int. Cl.
*C11D 3/00* (2006.01)
*C11D 3/22* (2006.01)
*C08B 37/00* (2006.01)
*C11D 11/00* (2006.01)

(52) U.S. Cl.
CPC ........ *C11D 3/0021* (2013.01); *C08B 37/0096* (2013.01); *C11D 3/227* (2013.01); *C11D 11/0017* (2013.01)

(58) Field of Classification Search
CPC ......... C11D 1/00; C11D 3/0021; C11D 3/227; C11D 11/0017; B08B 3/04
See application file for complete search history.

(56) References Cited

U.S. PATENT DOCUMENTS

| 5,627,151 | A | 5/1997 | Detering et al. |
| 6,159,921 | A | 12/2000 | Desai et al. |
| 2008/0033162 | A1 | 2/2008 | Karlson et al. |
| 2013/0210693 | A1 | 8/2013 | Lambert et al. |

FOREIGN PATENT DOCUMENTS

| DE | 102011116764 A1 | 4/2013 | |
| EP | 526800 * | 7/1992 | ............ C08F 226/00 |
| EP | 0526800 A1 | 2/1993 | |

* cited by examiner

*Primary Examiner* — Brian P Mruk
(74) *Attorney, Agent, or Firm* — Kenneth Crimaldi

(57) ABSTRACT

A laundry detergent comprising: (a) from 10 to 86 wt % surfactants, (b) from 0.05 to 2 wt % imidazole-modified carbohydrate polymer, (c) from 0.1 to 10 wt % builders and sequestrants and (d) from 2 to 88 wt % water.

6 Claims, No Drawings

IMIDAZOLE-MODIFIED CARBOHYDRATE POLYMERS AS LAUNDRY DYE TRANSFER INHIBITORS

This invention relates to imidazole-modified carbohydrate polymers as laundry dye transfer inhibitors.

Use of imidazole-containing polymers as dye transfer inhibitors in laundry detergents is known, as in, e.g., U.S. Pat. No. 5,627,151. However, this reference does not suggest the use of the modified polymers claimed herein.

The problem solved by this invention is the need for improved dye transfer inhibitors for use in laundry detergents.

STATEMENT OF INVENTION

The present invention provides a laundry detergent comprising: (a) from 10 to 86 wt % surfactants, (b) from 0.05 to 2 wt % imidazole-modified carbohydrate polymer, (c) from 0.1 to 10 wt % builders and sequestrants and (d) from 2 to 88 wt % water.

The present invention is further directed to a process for inhibiting dye transfer in a washing machine; said process comprising adding to the washing machine a laundry detergent comprising: (a) from 10 to 86 wt % surfactants, (b) from 0.05 to 2 wt % imidazole-modified carbohydrate polymer, (c) from 0.1 to 10 wt % builders and sequestrants and (d) from 2 to 88 wt % water.

DETAILED DESCRIPTION

Percentages are weight percentages (wt %) and temperatures are in ° C., unless specified otherwise. Operations were performed at room temperature (20-25° C.), unless specified otherwise. The detergent may be a powder, tablet, liquid or gel. "(Meth)acrylic" means acrylic or methacrylic. An "alkyl" group is a saturated, substituted or unsubstituted hydrocarbyl group having from one to twenty-two carbon atoms in a linear or branched arrangement. Alkyl groups are unsubstituted unless otherwise specified. An "alkenyl" group is an alkyl group having at least one carbon-carbon double bond, preferably one carbon-carbon double bond.

Preferably, the carbohydrate polymer is an alkyl cellulose ether, hydroxyalkyl cellulose ether, guar gum, locust bean gum, xanthan gum, amylose, amylopectin, or dextran. In the alkyl cellulose ethers, preferably the alkyl ether groups are $C_1$-$C_4$ alkyl; preferably $C_1$-$C_3$ alkyl; preferably methyl, ethyl; in hydroxyalkyl cellulose ethers, preferably the hydroxyalkyl groups are 2-hydroxyethyl or 2-hydroxypropyl. More than one type of alkyl or hydroxyalkyl group may be present on a cellulose ether. Especially preferred cellulose ethers include, e.g., methylcellulose (MC), ethylcellulose (EC), ethyl methyl cellulose, hydroxyethyl cellulose (HEC), hydroxypropyl cellulose (HPC), hydroxyethyl methyl cellulose (HEMC), hydroxypropyl methyl cellulose (HPMC), ethyl hydroxyethyl cellulose (EHEC), and carboxymethyl cellulose (CMC). HEC, HPMC, HEMC, and MC are preferred cellulose-based polymers. Specific examples of preferred cellulose based polymers include CELLOSIZE HEC, METHOCEL HPMC, and WALOCEL HEMC polymers commercially available from The Dow Chemical Company. The number of alkyl ether or hydroxyalkyl groups per glucopyranosyl unit is determined by analysis of the polymer. For example, for METHOCEL HPMC polymers the determination of the % methoxyl and % hydroxypropoxyl in hydroxypropyl methylcellulose is carried out according to the United States Pharmacopeia (USP 32). The values obtained are % methoxyl and % hydroxypropoxyl. These are subsequently converted into degree of substitution (DS) for methyl substituents and molar substitution (MS) for hydroxypropyl substituents. Residual amounts of salt and moisture have been taken into account in the conversion. The preferred % methoxyl varies between 10% and 35%, and the preferred % hydroxypropoxyl varies between 0 and 40%. For CELLOSIZE HEC polymers, the determination of the ethylene oxide molar substitution (EO MS) can be conducted using the Zeisel method as described in ASTM D-4794. The preferred EO MS varies between 0.5 and 5.0, preferably 1.5 to 3.5.

Preferably, an alkyl cellulose ether or a hydroxyalkyl cellulose ether has an average degree of substitution of 1.0 to 2.5 $C_1$-$C_6$ alkyl ether groups per glucopyranosyl unit; preferably it has a viscosity, measured from a 1 wt % solution in water at 20° C., of 10 to 100,000 mPa·s, preferably 50 to 7,000, preferably 100 to 6,000. Aqueous solution viscosities were measured for these cellulose ethers using either a Brookfield LVT viscometer at 25° C. and 30 rpm or according to United States Pharmacopeia (USP 35, "Hypromellose", pages 3467-3469) followed by an Ubbelohde viscosity measurement according to DIN 51562-1: 1999-01 (January 1999). Viscosities of cellulose ethers have been correlated with molecular weights, and accordingly, one skilled in the art would understand the meaning of either measurement. See C. M. Keary, *Carbohydrate Polymers*, vol. 45 (2001), pages 293-303. Cellulose polymers contain repeat units having a 1,4'-β-glucopyranosyl structure, also known as anhydroglucose.

Preferably, the alkyl or hydroxyalkyl cellulose ether is of formula (I)

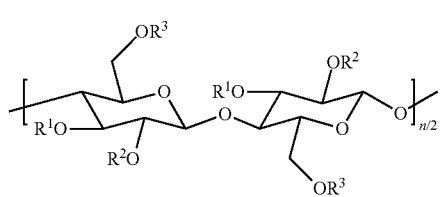

wherein $R^1$, $R^2$ and $R^3$ are independently selected from: hydrogen, alkyl or hydroxyalkyl; wherein alkyl groups may comprise from one to six carbon atoms which may be unsubstituted or substituted with carboxylic acid or salts thereof (attached to alkyl via carbon, e.g., carboxymethyl cellulose), halo or $C_1$-$C_4$ alkoxy; and n is from 25 to 7,500. Preferably, alkyl groups are unsubstituted. Preferably, n is from 600 to 6,000, preferably 1,000 to 5,000. Preferably, alkyl groups have from one to four carbon atoms, preferably from one to three.

An imidazole-modified carbohydrate has substituents attached to carbohydrate hydroxyl groups, the substituents having an imidazole ring. Preferably, the imidazole-containing substituents comprise an imidazole ring bonded to the polysaccharide polymer through a $C_2$-$C_{12}$ aliphatic group, a 2-hydroxypropyl group [—$CH_2$—CHOH—$CH_2$—], a polyethylene glycol group [(—$CH_2$—$CH_2$—O—)$_x$] where x is 1 to 10 (preferably 1 to 6), or a simple ether linkage [—O—]. In each case, the imidazole ring is attached to these groups via a linker, L, which is a $C_1$-$C_6$ aliphatic group bonded to the imidazole ring, preferably a $C_2$-$C_4$ aliphatic group. Preferably the aliphatic group is a linear aliphatic group having a hydroxyl substituent. Preferably the linker is bonded to an imidazole nitrogen atom. Preferably, the imidazole-modified carbohydrate is of formula (I) above, wherein an imidazole-containing substituent is one of the choices for $R^1$, $R^2$ or $R^3$; preferably $R^3$. Preferably, the degree of substitution of the imidazole-containing substituent is from 0.05 to 1, preferably from 0.1 to 0.5, preferably from 0.15 to 0.4.

Imidazole-modified carbohydrates useful in the present invention may be prepared by applying alkylation methods known in the art, e.g., alkylation of a carbohydrate hydroxyl group with either an epoxy-functionalized imidazole or a chlorohydrin-functionalized imidazole in the presence of a suitable base. Epoxy-functional imidazoles comprise an imidazole ring and a substituent which includes an epoxide ring; they include, e.g., imidazole having an epoxyalkyl group on one of the imidazole nitrogen atoms, preferably imidazole having a glycidyl group attached to a nitrogen atom. Similarly, a chlorohydrin-functionalized imidazole has a vicinal halohydroxy group chemically bound to the imidazole group. For example, an imidazole-modified hydroxyethyl cellulose ether may be prepared according to the following example reaction scheme where $R^1$ and $R^2$ are hydrogen and $R^3$ is —$CH_2$—$CH_2$—OH, and the HEC polymer is alkylated with either 3-chloro-2-hydroxypropyl imidazole or 1-glycidyl imidazole,

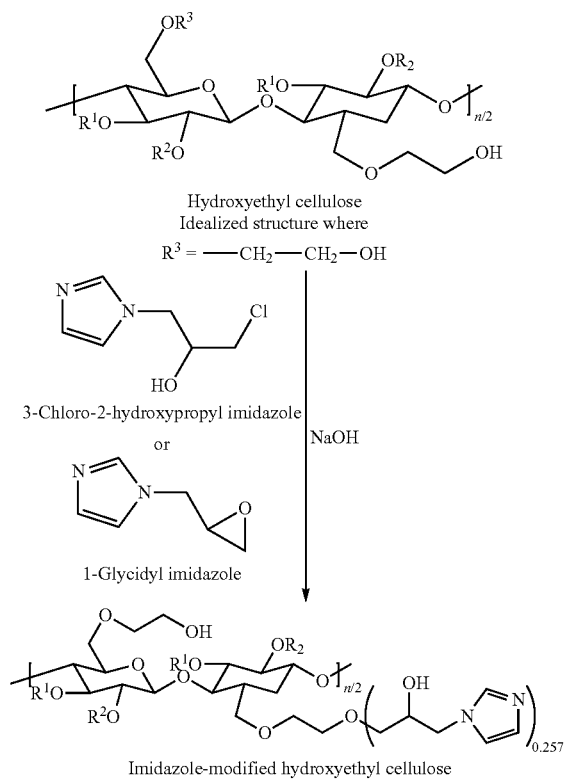

wherein $R^1$ and $R^2$ are hydrogen and $R^3$ is a hydroxyethyl group (—$CH_2$—$CH_2$—OH) as defined previously. The brackets around the two glucopyranosyl units indicate that these are the repeat units of a polysaccharide polymer with a degree of polymerization (DP) with a value of n. Chemical reactions of polysaccharides are usually conducted heterogeneously in which the polymer is suspended in an aqueous organic diluent. Diluents which may be useful in the synthesis of these imidazole-modified polysaccharides include water-soluble polar organic solvents such as methanol, ethanol, 1-propanol, 2-methyl-2-propanol, 2-butanone and tetrahydrofuran; preferably acetone or 2-propanol. To effect sufficient swelling of the polysaccharide, some amount of water in the diluent is desirable. Suitable bases include, e.g., metal (especially alkali metal) hydroxides, preferably sodium hydroxide. Preferably, the reaction is carried out at a temperature from 10° C. to 100° C., preferably from 15° C. to 70° C. To some degree all the hydroxyl groups in the cellulose ether polymer are susceptible to alkylation by a glycidyl imidazole or a chlorohydrin imidazole or similar imidazole-type alkylating agent. Therefore, multiple imidazole alkylations at different positions around a given glucopyranosyl unit are possible, and some of the glucopyranosyl units would be unreactive to alkylation and thus contain no imidazole substituents. While the example shown here involves the alkylation of HEC with a glycidyl imidazole or a chlorohydrin imidazole, the same general chemistry is possible with many polysaccharides including starch, guar gum (II), locust bean gum, and xanthan gum.

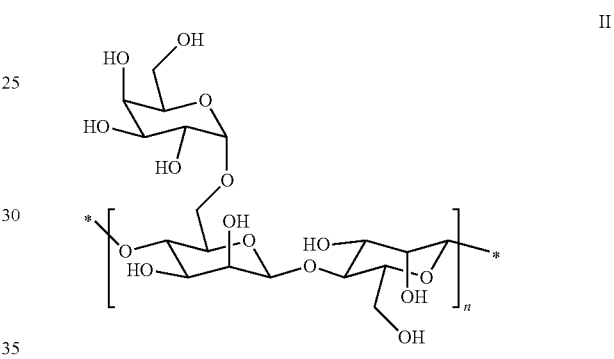

Preferably, the detergent comprises at least 0.1 wt % of the imidazole-modified carbohydrate polymer, preferably at least 0.15 wt %, preferably at least 0.2 wt %; preferably no more than 1.5 wt %, preferably no more than 1.2 wt %, preferably no more than 0.9 wt %. Preferably, the detergent comprises at least 12 wt % surfactants, preferably at least 14 wt %, preferably at least 17 wt %, preferably at least 20 wt %, preferably at least 25 wt %, preferably at least 30 wt %, preferably at least 35 wt %, preferably at least 40 wt %, preferably at least 45 wt %, preferably at least 50 wt %, preferably at least 55 wt %, preferably at least 60 wt %, preferably at least 65 wt %, preferably at least 70 wt %, preferably at least 75 wt %, preferably at least 80 wt %. Preferably, the detergent comprises no more than 82 wt % surfactants, preferably no more than 80 wt %, preferably no more than 75 wt %, preferably no more than 70 wt %, preferably no more than 65 wt %, preferably no more than 60 wt %, preferably no more than 55 wt %, preferably no more than 50 wt %, preferably no more than 45 wt %, preferably no more than 40 wt %, preferably no more than 35 wt %, preferably no more than 30 wt %, preferably no more than 25 wt %, preferably no more than 20 wt %. In a preferred embodiment of the invention, the detergent comprises from 10 to 25 wt % surfactants, preferably from 12 to 20 wt %, preferably from 13 to 18 wt %.

Preferably, the detergent comprises at least 5 wt % water, preferably at least 15 wt %, preferably at least 25 wt %, preferably at least 35 wt %, preferably at least 40 wt %, preferably at least 45 wt %, preferably at least 50 wt %, preferably at least 55 wt %, preferably at least 60 wt %, preferably at least 65 wt %, preferably at least 70 wt %;

preferably no more than 86 wt %, preferably no more than 82 wt %, preferably no more than 75 wt %, preferably no more than 70 wt %, preferably no more than 65 wt %, preferably no more than 60 wt %, preferably no more than 55 wt %, preferably no more than 50 wt %. In a preferred embodiment of the invention, the detergent comprises from 75 to 88 wt %, preferably from 78 to 86 wt %.

Preferably, the detergent composition comprises from 0.3 to 9 wt % builders and sequestrants; preferably at least 0.5 wt %, preferably at least 1 wt %, preferably at least 1.5 wt %, preferably at least 2 wt %; preferably no more than 8 wt %, preferably no more than 6 wt %, preferably no more than 5 wt %. Preferably, builders and sequestrants are selected from the group consisting of citrates, phosphates, carbonates, aluminosilicates, organic phosphonates, carboxylates, polycarboxylates (e.g., polyacrylic acid or maleic/(meth) acrylic acid copolymers) and polyacetyl carboxylates. Builders and sequestrants may be added as salts or in the acid form, where feasible. Preferably, the builder is a citrate salt or citric acid.

Preferably, the detergent composition comprises from 0.05 to 2 wt % of a cationic cellulose polymer, preferably at least 0.1 wt %, preferably at least 0.2 wt %, preferably at least 0.3 wt %; preferably no more than 1.5 wt %, preferably no more than 1.2 wt %, preferably no more than 1 wt %, preferably no more than 0.6 wt %. A cationic cellulose is a cellulose polymer having a quaternary ammonium substituent group. Preferably, a cationic cellulose polymer is a cationically-modified hydroxyethyl cellulose, preferably prepared by the alkylation reaction of glycidyl trimethylammonium chloride and/or 3-chloro-2-hydroxypropyldimethyldodecylammonium chloride with hydroxyethyl cellulose. Preferably, a cationic cellulose polymer is prepared from glycidyl trimethylammonium chloride. Such polymers have the assigned INCI name (International Nomenclature of Cosmetic Names) of polyquatemium-10 and the CAS number of 68610-92-4. Preferably, the solution viscosity of cationic cellulose polymers is from 50 to 800 cP for a 2% aqueous solution, preferably from 75 to 500, preferably from 75 to 175. Preferably, the Kjeldahl nitrogen content of the polymer is 0.2 to 3%, preferably from 0.4 to 2.5%, preferably from 1.5 to 2.2%.

The detergent may also comprise hydrotropes (e.g., ethanol, propylene glycol), enzymes (e.g., protease, lipase, amylase), preservatives, perfumes, fluorescent agents, shading dyes and additive polymers (e.g., anti-redeposition polymers, anti-greying polymers).

The surfactant(s) may be cationic, anionic, nonionic, fatty acid metal salt, zwitterionic or betaine surfactants. Preferably, the surfactant comprises at least one surfactant selected from anionic and nonionic surfactants, preferably at least two. Preferably, nonionic surfactants have an alkyl group having at least eight carbon atoms and at least five polymerized ethylene oxide or propylene oxide residues. Preferably, nonionic surfactants have at least five polymerized ethylene oxide residues, preferably at least six, preferably at least seven, preferably at least eight; preferably no more than twelve, preferably no more than eleven, preferably no more than ten. Preferably, the detergent composition comprises at least 2 wt % linear alcohol ethoxylates, preferably at least 2.5 wt %, preferably at least 3 wt %. In a preferred embodiment of the invention, the detergent comprises from 2 to 6 wt %, preferably from 2.5 to 5.5 wt %. Preferably, a linear alcohol ethoxylate has a linear $C_6$-$C_{16}$ alkyl group, preferably $C_8$-$C_{14}$. Preferably the alkyl groups are mixtures derived from seed oil, preferably comprising 70% $C_8$-$C_{10}$ linear alkyl and 70% $C_{12}$-$C_{14}$ linear alkyl. Preferably, a linear alcohol ethoxylate contains from five to nine polymerized units of ethylene oxide, preferably seven. Preferably, a linear alcohol ethoxylate has two to four polymerized units of propylene oxide between the alkyl group and the ethylene oxide units, preferably three units of propylene oxide. Preferably, anionic surfactants have an alkyl group having at least ten carbon atoms and an anionic group, preferably selected from sulfonates and carboxylates. Anionic surfactants also may have polymerized residues of ethylene oxide, and/or may have aromatic rings, e.g., linear alkylbenzene sulfonates. Some anionic surfactants are fatty acid alkali metal salts. Preferably, the detergent composition comprises at least 2 wt % linear alkylbenzene sulfonates, preferably at least 3 wt %, preferably at least 4 wt %. In a preferred embodiment of the invention, the detergent composition comprises from 2.5 to 7 wt % linear alkylbenzene sulfonates, preferably 3.5 to 6 wt %. Preferably, alkylbenzene sulfonates have a $C_{10}$-$C_{14}$ alkyl group. Preferably, the detergent composition comprises at least 2 wt % alkyl sulfates, preferably at least 3 wt %, preferably at least 4 wt %. In a preferred embodiment of the invention, the detergent composition comprises from 3 to 8 wt % alkyl sulfates, preferably 4 to 7 wt %. Preferably, an alkyl sulfate contains from one to five polymerized ethylene oxide units per molecule.

Preferably, when the detergent composition is in liquid form it has a pH from 6 to 11, preferably from 6.5 to 10, preferably 7 to 9, preferably from 7 to 8.5, preferably from 7 to 8. Suitable bases to adjust the pH of the formulation include mineral bases such as sodium hydroxide and potassium hydroxide; ammonium hydroxide; and organic bases such as mono-, di- or tri-ethanolamine; or 2-dimethylamino-2-methyl-1-propanol (DMAMP). Mixtures of bases may be used. Suitable acids to adjust the pH of the aqueous medium include mineral acid such as hydrochloric acid, phosphorus acid, and sulfuric acid; and organic acids such as acetic acid. Mixtures of acids may be used. The formulation may be adjusted to a higher pH with base and then back titrated to the ranges described above with acid.

EXAMPLES

Synthesis of Imidazole-Modified Hydroxyethyl Cellulose

The glycidyl imidazole alkylating agent was prepared by the following procedure. A 125 ml Erlenmeyer flask was charged with 5.17 g of imidazole (75.94 mmoles), 5.96 g of 50% aqueous sodium hydroxide solution (74.50 mmoles), and 30.00 g of distilled water. The solution was gently heated to 50° C. while stirring on a magnetic hot plate. While holding at 50° C., 6.99 g of epichlorohydrin (75.55 mmoles) were added by pipet in small portions with stirring. The epichlorohydrin is insoluble in the aqueous mixture, but as it reacts, the solution becomes homogeneous. The epichlorohydrin addition rate is controlled to keep the temperature of the aqueous solution between 50° C. and 55° C., removing the flask from the hot plate and cooling in water as required. The addition time for the epichlorohydrin was about 30 minutes. After the epichlorohydrin addition was complete and the solution was homogeneous, the mixture was stirred for 30 minutes at 60° C. The light straw-colored solution is then ready for use, but can be stored overnight in the refrigerator.

A 500 ml resin kettle was fitted with a mechanical stirring paddle, a nitrogen inlet, a serum cap, a subsurface thermocouple, two syringes, and a reflux condenser connected to a mineral oil bubbler. The resin kettle was charged with 30.00 g (contained) CELLOSIZE HEC QP-100MH (lot XF2308ZW08, 120.0 mmoles), 170 g of acetone, and 6 g of distilled water. While stirring the mixture, the reactor was purged with nitrogen for one hour to remove any entrained oxygen.

While stirring under nitrogen, 4.14 g of 25% aqueous sodium hydroxide solution (25.9 mmoles) were added dropwise over five minutes using a syringe. The mixture was then allowed to stir for 30 minutes under nitrogen. Then, the solution of glycidyl imidazole as prepared above was added dropwise by syringe over 15 minutes under nitrogen. Heat was then applied to the slurry, which was allowed to reflux under nitrogen for 2 hours.

The slurry was cooled to room temperature and neutralized by adding 4.85 g of glacial acetic acid and stirring for 15 minutes. The polymer was collected by vacuum filtration and washed in a blender: five times with a mixture of 400 ml of acetone and 80 ml of water, and twice with 500 ml of pure acetone. To confer cold-water dispersibility on the polymer, 0.31 g of 40% aqueous glyoxal and 0.17 g of glacial acetic acid are added to the second acetone desiccation step. The polymer was dried overnight in vacuo at 50° C., yielding 35.43 g of polymer 201104021-23 with a volatiles content of 1.60%, an ash content of 3.83% (as sodium acetate), and a Kjeldahl nitrogen content of 2.420% (corrected for ash and volatiles), corresponding to a DS value of 0.257. The 1% Brookfield viscosity at 25.0° C. and 30 rpm was found to be 3209 cP.

Synthesis of Imidazole-Modified Guar Gum The glycidyl imidazole alkylating agent was prepared by the following procedure. A 125 ml Erlenmeyer flask was charged with 7.25 g of imidazole (106.5 mmoles), 8.51 g of 50% aqueous sodium hydroxide solution (106.4 mmoles), and 28.00 g of distilled water. The solution was gently heated to 50° C. while stirring on a magnetic hot plate. While holding at 50° C., 13.16 g of epichlorohydrin (106.0 mmoles) were added by pipet in small portions with stirring. The epichlorohydrin is insoluble in the aqueous mixture, but as it reacts, the solution becomes homogeneous. The epichlorohydrin addition rate is controlled to keep the temperature of the aqueous solution between 50° C. and 55° C., removing the flask from the hot plate and cooling in water as required. The addition time for the epichlorohydrin was about 30 minutes. After the epichlorohydrin addition was complete and the solution was homogeneous, the mixture was stirred for 30 minutes at 60° C. The light straw-colored solution is then ready for use, but can be stored overnight in the refrigerator.

A 500 ml resin kettle was fitted with a mechanical stirring paddle, a nitrogen inlet, a serum cap, a subsurface thermocouple, two syringes, and a reflux condenser connected to a mineral oil bubbler. The resin kettle was charged with 30.00 g (contained) Weatherford WGA-15 guar flour (119.2 mmoles), 170 g of acetone, and 6 g of distilled water. While stirring the mixture, the reactor was purged with nitrogen for one hour to remove any entrained oxygen.

While stirring under nitrogen, 4.33 g of 25% aqueous sodium hydroxide solution (54.1 mmoles) were added dropwise over five minutes using a syringe. The mixture was then allowed to stir for 30 minutes under nitrogen. Then, the solution of glycidyl imidazole as prepared above was added dropwise by syringe over 15 minutes under nitrogen. Heat was then applied to the slurry, which was allowed to reflux under nitrogen for 2 hours.

The slurry was cooled to room temperature and neutralized by adding 8.00 g of glacial acetic acid and stirring for 15 minutes. The polymer was collected by vacuum filtration and washed in a blender: five times with a mixture of 400 ml of acetone and 100 ml of water, and twice with 500 ml of pure acetone. The polymer was dried overnight in vacuo at 50° C., yielding 36.44 g of imidazole-modified guar with a volatiles content of 5.86%, an ash content of 4.22% (as sodium acetate), and a Kjeldahl nitrogen content of 2.65% (corrected for ash and volatiles). The 1% Brookfield viscosity (corrected for ash and volatiles) at 25.0° C. and 30 rpm was found to be 2891 cP.

Dye Transfer Inhibition Test Procedure Using Launder-O-Meter (LOM) Testing

Materials:

A simplified Light Duty Laundry formulation (LDL) selected for studying the Dye transfer inhibition technologies is the following:

| List of ingredients (in order of addition) | % weight |
| --- | --- |
| Water | 50% |
| Citric acid | 2% |
| Surfactant A (specialty linear alcohol ethoxylate: nonionic surfactant,) | 4% |
| Dye transfer inhibition technology | 0.25% or 0.37% |
| NANSA SS 50 (from Huntsman, sodium dodecylbenzenesulfonate: anionic surfactant) | 4.95% |
| STEOL CS-370E (from Stepan, sodium lauryl ether sulfate anionic surfactant) | 5.74% |
| DMAMP-80 (from Dow-Angus portfolio) | To pH 7.5 |
| Water | To 100% |

Surf. A $R^1O(CH_2CH(CH_3)O)_3(CH_2CH_2O)_7H$, where $R^1$ represents a mixture of alkyl groups derived from seed oil and comprising 70% $C_8$-$C_{10}$ linear alkyl and 70% $C_{12}$-$C_{14}$ linear alkyl.

Just before running the dye transfer Inhibition test, this LDL was diluted in tap water to obtain a final concentration of 4.5 g/L; concentration reached in a European washing machine during the wash cycle.

| Name | description | DS | volatiles (wt %) | Ash (wt %) | MW | 1% viscosity at 6.31 sec$^{-1}$ |
| --- | --- | --- | --- | --- | --- | --- |
| polymer 1 | Imidazole modified HEC | 0.257 | 1.60 | 3.83 | 1.6 * 10$^6$ | 2950 cP |

DS = degree of substitution

The control polymer is a cationic hydroxyethyl cellulose polymer which is a reaction product of hydroxyethyl cellulose with glycidyl trimethylammonium chloride. The polymer has viscosity 75-125 cP (2% aq); % N: 1.5-2.2%.

Description of the Launder-O-Meter (LOM) Equipment from Atlas.

The Launder-O-Meter (LOM) reproduces what happens in a European washing machine but at a smaller scale (see picture 1: "Launder-o-meter", picture2: "Pot+cap" and picture 3:" Rotation axis"). This machine contains 20 pots that we fix to an axis that rotates. Each pot represents one European washing machine. One set of experiments is equal to 20 washing machines.

Test Procedure:

1/ Setting of the LOM:

40° C. during 45 min

Each LOM pot contains:

5 stainless steel balls 400 mL Light Duty Laundry (LDL) solution at 4.5 g/L in tap water.*

One Color acceptor swatch: 1 cotton swatch bought from Wfk Testgewebe GmbH, code 10A; size 5*5 cm One Color acceptor swatch: 1 Polyester cotton swatch bought from Wfk Testgewebe GmbH code 20A, size 5*5 cm One dye transfer cotton swatch dyed with either;

Direct blue 71 bought from Center For Testmaterials BV, code E-133, size 5*5 cm, or Direct Red 83.1 bought from Center For Testmaterials BV, code E-130, size 5*5 cm, or Direct Black 22, bought from Center For Testmaterials BV, code E-132, size 5*5 cm

*Note: The LDL model formulation is described in the "Material" paragraph: ". The dye transfer technologies which have been studied are listed in the same paragraph.

We have run 4 replicas per Direct Red 83.1 dye tested in 4 different LOM pots and 2 replicas per Direct blue 71 and per Direct Black 22 dyes in 2 different LOM pots. All the dyes have been studied separately.

2/ Preparation of the Fabrics Swatches:

Measure of the color of the cotton and polyester cotton color acceptor swatches before washing with a Konica Minolta CM2600d spectrocolorimeter (reflectance measurement type; observer 10 degree; primary D65 and UV settings 400 nm (UV cut)).

In each LOM pot, put one cotton and one polyester cotton color acceptor swatches, one dye transfer cotton swatch dyed (either with Direct blue 71, Direct Red 83.1 or Direct Black 22) 5 stainless steel balls and add 400 mL of the detergent with a concentration of 4.5 g/L (4 pots/formulation).

Wash at 40° C., during 45 minutes.

3/Measurement: Dye Transfer

The Dye transfer is assessed by the calculation of the color difference (Delta E) before and after washing the cotton and polyester cotton color acceptor swatches.

The color measurement is obtained with a Konica Minolta CM2600d spectrocolorimeter (reflectance measurement type; observer 10 degree; primary D65 and UV settings 400 nm (UV cut)).

Delta E of each swatch has been calculated from the L*a*b* values of unwashed and washed swatch, following the following equation:

$$\Delta E = \{(L^*_{unwashed} - L^*_{washed})^2 + (a^*_{unwashed} - a^*_{washed})^2 + (b^*_{unwashed} - b^*_{washed})^2\}^{1/2}$$

When Delta E is high, the dye transfer is also important.

Background Information and Results:

A negative reference consists of the LDL (Light duty laundry) without any dye transfer inhibition technology inside. The Dye transfer inhibition technology should show lower ΔE than this negative reference to provide Dye transfer inhibition performance The Dow dye transfer inhibition technologies have been formulated at 0.37% weight in the LDL formulation. In order to evaluate Polymer 1, two LDL formulations have been formulated. These two formulations have been named "trial1" and "trial2".

TABLE 1

Dye transfer inhibition results with Direct Red 83.1 both on cotton and polyester Cotton (Co/Pe) Color acceptor swatches: Delta E data.

| Dye transfer Inhibition performance with Direct Red Dye 83.1 on cotton dye donator swatch | Average of dE*ab(D65) (4 replicates) (low is best) | Average of standard deviation |
|---|---|---|
| cotton fabric from Wfk Testgewebe GmbH | | |
| LDL without DTI | 10.52 | 1.83 |
| LDL with 0.37 wt % control polymer | 6.38 | 0.41 |

TABLE 1-continued

Dye transfer inhibition results with Direct Red 83.1 both on cotton and polyester Cotton (Co/Pe) Color acceptor swatches: Delta E data.

| Dye transfer Inhibition performance with Direct Red Dye 83.1 on cotton dye donator swatch | Average of dE*ab(D65) (4 replicates) (low is best) | Average of standard deviation |
|---|---|---|
| LDL with 0.37% Polymer 1 trial 1 | 3.78 | 0.19 |
| LDL with 0.37% Polymer 1 trial 2 | 3.08 | 0.74 |
| Cotton/Polyester fabric from Wfk Testgewebe GmbH | | |
| LDL without DTI | 7.68 | 0.72 |
| LDL with 0.37 wt % control polymer | 6.01 | 0.45 |
| LDL with 0.37% Polymer 1 trial 1 | 1.86 | 0.13 |
| LDL with 0.37% Polymer 1 trial 2 | 2.15 | 0.55 |

TABLE 2

Dye transfer inhibition results with Direct Blue 71 both on cotton and polyester Cotton (Co/Pe) Color acceptor swatches: Delta E data.

| Dye transfer Inhibition performance with Direct Blue Dye 71 dye on cotton donator swatch | Average of dE*ab(D65) (2 replicates) (low is best) | Average of standard deviation |
|---|---|---|
| cotton fabric from Wfk Testgewebe GmbH | | |
| LDL without DTI | 7.63 | 0.14 |
| LDL with 0.37 wt % control polymer | 2.90 | 0.17 |
| LDL with 0.37% Polymer 1 trial 1 | 7.35 | 0.40 |
| LDL with 0.37% Polymer 1 trial 2 | 6.99 | 0.04 |
| cotton/polyester fabric from Wfk Testgewebe GmbH | | |
| LDL without DTI | 5.66 | 0.21 |
| LDL with 0.37 wt % control polymer | 2.17 | 0.20 |
| LDL with 0.37% Polymer 1 trial 1 | 5.48 | 0.56 |
| LDL with 0.37% Polymer 1 trial 2 | 5.15 | 0.13 |

TABLE 3

Dye transfer inhibition results with Direct Black 22 both on cotton and polyester Cotton (Co/Pe) Color acceptor swatches: Delta E data.

| Dye transfer Inhibition performance with Direct Black Dye 22 on cotton dye donator swatch | Average of dE*ab(D65) (2 replicates) (low is best) | Average of standard deviation |
|---|---|---|
| cotton fabric from Wfk Testgewebe GmbH | | |
| LDL without DTI | 2.87 | 0.17 |
| LDL with 0.37 wt % control polymer | 2.81 | 0.31 |
| LDL with 0.37% Polymer 1 trial 1 | 2.52 | 0.01 |
| LDL with 0.37% Polymer 1 trial 2 | 2.64 | 0.13 |
| cotton/polyester fabric from Wfk Testgewebe GmbH | | |
| LDL without DTI | 2.20 | 0.13 |
| LDL with 0.37 wt % control polymer | 1.95 | 0.01 |
| LDL with 0.37% Polymer 1 trial 1 | 1.69 | 0.07 |
| LDL with 0.37% Polymer 1 trial 2 | 1.89 | 0.03 |

The nature of the stain plays an important role in selecting a dye transfer inhibitor. For inhibiting the transfer of dye Direct red 83.1, Polymer 1 is superior. The Direct Black 22 dye is not relevant in this study as the DTI value remains low and not visible by eye.

TABLE 4

Study of the mix of the control polymer and Polymer 1 on Dye transfer inhibition with Direct Red 83.1 both on cotton and polyester Cotton (Co/Pe) Color acceptor swatches: Delta E data.

| Dye transfer Inhibition performance with Direct Red Dye 83.1 on cotton donator swatch | Average of dE*ab(D65) (2 replicates) (low is best) | Average of standard deviation |
|---|---|---|
| cotton fabric from Wfk Testgewebe GmbH | | |
| LDL without DTI | 7.62 | 0.46 |
| LDL with 0.37% control polymer | 5.57 | 0.40 |
| LDL with 0.37% Polymer 1 | 2.79 | 0.28 |
| LDL with 0.37% Polymer 1 + 0.37% control polymer | 2.53 | 0.17 |
| LDL with 0.185% Polymer 1 + 0.185% control polymer | 2.46 | 0.02 |
| Co/Pe fabric from Wfk Testgewebe GmbH | | |
| LDL without DTI | 5.76 | 0.53 |
| LDL with 0.37% Cationic hydroxyethyl cellulose polymer 1 | 3.89 | 0.04 |
| LDL with 0.37% Polymer 1 | 1.89 | 0.15 |
| LDL with 0.37% Polymer 1 + 0.37% control polymer | 2.41 | 0.72 |
| LDL with 0.185% Polymer 1 + 0.185% control polymer | 1.90 | 0.26 |

TABLE 5

Study of the mix of the control polymer and Polymer 1 on Dye transfer inhibition with Direct Blue 71 both on cotton and polyester Cotton (Co/Pe) Color acceptor swatches: Delta E data.

| Dye transfer Inhibition performance with Direct Blue Dye 71 dye on cotton donator swatch | Average of dE*ab(D65) (2 replicates) (low is best) | Average of standard deviation |
|---|---|---|
| cotton fabric from wfk Testgewebe GmbH | | |
| LDL without DTI | 8.56 | 0.43 |
| LDL with 0.37% control polymer | 3.09 | 0.02 |
| LDL with 0.37% Polymer 1 | 7.71 | 0.14 |
| LDL with 0.37% Polymer 1 + 0.37% control polymer | 3.02 | 0.39 |
| LDL with 0.185% Polymer 1 + 0.185% control polymer | 3.34 | 0.03 |
| Co/Pe fabric from wfk Testgewebe GmbH | | |
| LDL without DTI | 6.66 | 0.77 |
| LDL with 0.37% control polymer | 2.46 | 0.10 |
| LDL with 0.37% Polymer 1 | 6.04 | 0.18 |
| LDL with 0.37% Polymer 1 + 0.37% control polymer | 2.68 | 0.19 |
| LDL with 0.185% Polymer 1 + 0.185% control polymer | 2.73 | 0.10 |

Mixing the control polymer and Polymer 1 into the LDL improves the dye transfer inhibition performance on both Direct Red 83.1 and Direct Blue 71. Surprisingly, we have found that we obtain the same level of dye transfer inhibition performance with a mixture of 0.185% Polymer 1 +0.185% control polymer into the LDL in comparison with a mixture of 0.37% Polymer 1 +0.37% control polymer into the LDL.

The invention claimed is:

1. A liquid laundry detergent comprising: (a) from 10 to 86 wt % surfactants, (b) from 0.05 to 2 wt % imidazole-modified carbohydrate polymer comprising an alkylation product of hydroxyethylcellulose and either imidazole having an epoxyalkyl substituent or imidazole having a vicinal halohydroxy group, (c) from 0.1 to 10 wt % builders and sequestrants and (d) from 2 to 88 wt % water.

2. The liquid laundry detergent of claim 1 having from 0.1 to 1.2 wt % imidazole-modified carbohydrate polymer.

3. A method for inhibiting dye transfer in a washing machine; said process comprising adding to the washing machine a laundry detergent comprising: (a) from 10 to 86 wt % surfactants, (b) from 0.05 to 2 wt % imidazole-modified carbohydrate polymer comprising an alkylation product of hydroxyethylcellulose and either imidazole having an epoxyalkyl substituent or imidazole having a vicinal halohydroxy group, (c) from 0.1 to 10 wt % builders and sequestrants and (d) from 2 to 88 wt % water.

4. The method of claim 3 having from 0.1 to 1.2 wt % imidazole-modified carbohydrate polymer.

5. The liquid laundry detergent of claim 2 in which the imidazole having an epoxyalkyl substituent is 1-glycidylimidazole and the imidazole having a vicinal halohydroxy group is 3-chloro-2-hydroxypropyl imidazole.

6. The method of claim 4 in which the imidazole having an epoxyalkyl substituent is 1-glycidylimidazole and the imidazole having a vicinal halohydroxy group is 3-chloro-2-hydroxypropyl imidazole.

\* \* \* \* \*